United States Patent
Chung (10) Patent No.: US 10,198,599 B2
(45) Date of Patent: Feb. 5, 2019

(54) PRIVACY USER INTERACTIVE APPARATUS, ELECTRONIC APPARATUS HAVING THE SAME, AND USER INTERACTIVE METHOD FOR PROTECTING PRIVACY

(71) Applicant: BOE TECHNOLOGY GROUP CO., LTD., Beijing (CN)

(72) Inventor: Chiehhsing Chung, Beijing (CN)

(73) Assignee: BOE TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/542,047

(22) PCT Filed: Jan. 18, 2017

(86) PCT No.: PCT/CN2017/071502
§ 371 (c)(1),
(2) Date: Jul. 6, 2017

(87) PCT Pub. No.: WO2017/202043
PCT Pub. Date: Nov. 30, 2017

(65) Prior Publication Data
US 2018/0218178 A1    Aug. 2, 2018

(30) Foreign Application Priority Data

May 27, 2016 (CN) .......................... 2016 1 0378216

(51) Int. Cl.
*G06F 21/84* (2013.01)
*H04N 13/302* (2018.01)
(Continued)

(52) U.S. Cl.
CPC .......... *G06F 21/84* (2013.01); *G06F 3/04886* (2013.01); *G06F 21/00* (2013.01);
(Continued)

(58) Field of Classification Search
CPC ..................... G06F 2203/04802; G06F 3/0414
(Continued)

(56) References Cited

U.S. PATENT DOCUMENTS

| 7,013,435 B2 * | 3/2006 | Gallo | G06F 3/04815 |
| | | | 707/E17.111 |
| 8,570,329 B1 * | 10/2013 | Ofstad | G06T 13/20 |
| | | | 345/473 |

(Continued)

FOREIGN PATENT DOCUMENTS

| CN | 102446382 A | 5/2012 |
| CN | 105608779 A | 5/2016 |
| CN | 105808015 A | 7/2016 |

OTHER PUBLICATIONS

International Search Report & Written Opinion dated May 2, 2017 regarding PCT/CN2017/071502.

*Primary Examiner* — Teshome Hailu
(74) *Attorney, Agent, or Firm* — Intellectual Valley Law, P.C.

(57) ABSTRACT

The present application discloses a privacy user interactive apparatus including a display panel configured to display a stereoscopic image of a user input interface in a three-dimensional display space; a three-dimensional positional sensor configured to detect a three-dimensional position of a user input object; and a processor coupled to the display panel and the three-dimensional positional sensor, configured to control the display panel to display the stereoscopic image of the user input interface in the three-dimensional display space, configured to receive an input control signal from the three-dimensional positional sensor, and configured to execute an operation in response to the input control signal. The display panel is configured to display a three-dimensional image of the user input interface in the three- (Continued)

dimensional display space and a two-dimensional image outside the three-dimensional display space.

20 Claims, 4 Drawing Sheets

(51) Int. Cl.
*H04N 13/361* (2018.01)
*G06F 3/0488* (2013.01)
*G06F 21/00* (2013.01)
*H04N 13/398* (2018.01)
*G06F 3/041* (2006.01)
*H04N 13/356* (2018.01)

(52) U.S. Cl.
CPC ......... *H04N 13/302* (2018.05); *H04N 13/361* (2018.05); *H04N 13/398* (2018.05); *G06F 3/0414* (2013.01); *G06F 3/04883* (2013.01); *G06F 2203/04106* (2013.01); *G06F 2203/04802* (2013.01); *H04N 13/356* (2018.05)

(58) Field of Classification Search
USPC .......................................................... 726/26
See application file for complete search history.

(56) References Cited

U.S. PATENT DOCUMENTS

| | | | |
|---|---|---|---|
| 9,417,716 B2* | 8/2016 | Ludwig | G06F 3/0346 |
| 2005/0204306 A1* | 9/2005 | Kawahara | G06F 3/0481 |
| | | | 715/782 |
| 2008/0074347 A1 | 3/2008 | Sumiyoshi | |
| 2009/0006998 A1* | 1/2009 | Neeleman | G06F 3/0482 |
| | | | 715/771 |
| 2012/0176366 A1* | 7/2012 | Genova | G06T 15/205 |
| | | | 345/419 |
| 2012/0314022 A1* | 12/2012 | Jo | H04N 21/4223 |
| | | | 348/42 |
| 2013/0091445 A1* | 4/2013 | Treadway | G06F 3/0481 |
| | | | 715/762 |
| 2016/0012276 A1* | 1/2016 | Malitz | G06K 9/0063 |
| | | | 382/113 |

* cited by examiner

FIG. 1

Related Art

PRIVACY USER INTERACTIVE APPARATUS, ELECTRONIC APPARATUS HAVING THE SAME, AND USER INTERACTIVE METHOD FOR PROTECTING PRIVACY

CROSS-REFERENCE TO RELATED APPLICATION

This application is a national stage application under 35 U.S.C. § 371 of International Application No. PCT/CN2017/071502 filed Jan. 18, 2017, which claims priority to Chinese Patent Application No. 201610378216.0, filed May 27, 2016, the contents of which are incorporated by reference in the entirety.

TECHNICAL FIELD

The present invention relates to display technology, more particularly, to a privacy user interactive apparatus, an electronic apparatus having the same, and a user interactive method for protecting privacy.

BACKGROUND

Mobile apparatuses such as mobile phones have been developed to provide many functions. A user may use a mobile apparatus to access various private information. For example, the user may use a mobile phone to access bank accounts, pay bills, carry out on-line purchases, and access various password-protected websites. Personal information of these types is private and is often subject to identity theft and invasion of privacy. Thus, in recent years, privacy protection has become a focus of research and development in display technology.

SUMMARY

In one aspect, the present invention provides a privacy user interactive apparatus, comprising a display panel configured to display a stereoscopic image of a user input interface in a three-dimensional display space; a three-dimensional positional sensor configured to detect a three-dimensional position of a user input object; and a processor coupled to the display panel and the three-dimensional positional sensor, configured to control the display panel to display the stereoscopic image of the user input interface in the three-dimensional display space, configured to receive an input control signal from the three-dimensional positional sensor, and configured to execute an operation in response to the input control signal; wherein the display panel is configured to display a three-dimensional image of the user input interface in the three-dimensional display space and a two-dimensional image outside the three-dimensional display space; and the processor is configured to control the display panel to display a plurality of activatable virtual objects comprising at least a first group of one or more activatable virtual objects substantially at a first depth level and a second group of one or more activatable virtual objects substantially at a second depth level; the first depth level and the second depth level being two different depth levels in the three-dimensional image of the user input interface.

Optionally, the plurality of activatable virtual objects are visually separately discernable from each other when viewed in the three-dimensional display space and are not visually separately discernable from each other when viewed outside the three-dimensional display space.

Optionally, the three-dimensional positional sensor is configured to detect a touch control operation of the user input object on the display panel and a pressure applied by the user input object during the touch control operation.

Optionally, the processor is configured to obtain the three-dimensional position of the user input object, configured to control the display panel to display a position indicator in the three-dimensional image of the user input interface indicating the three-dimensional position of the user input object; and a three-dimensional position of the position indicator in the three-dimensional image of the user input interface changes in response to a change of the three-dimensional position of the user input object.

Optionally, the processor is configured to generate a signal indicating that an activatable virtual object is a selected activatable virtual object when the position indicator is substantially coincident with the activatable virtual object.

Optionally, the processor is configured to execute a function programmed for a selected activatable virtual object upon receiving a signal indicating that contents associated with the selected activatable virtual object is inputted.

Optionally, the plurality of activatable virtual objects further comprises a third group of one or more activatable virtual objects displayed substantially at a third depth level and a fourth group of one or more activatable virtual objects displayed substantially at a fourth depth level; the first depth level, the second depth level, the third depth level, and the fourth depth level being four different depth levels in the three-dimensional image of the user input interface.

Optionally, activatable virtual objects displayed substantially at the first depth level and the second depth level have at least partially overlapping projections on the display panel along a depth direction of the stereoscopic image.

Optionally, the processor is configured to control the display panel to display at least one of the plurality of activatable virtual objects configured with a background context.

Optionally, the user input interface comprises a three-dimensional keyboard comprising a first group of one or more keys displayed substantially at the first depth level and a second groups of one or more keys displayed substantially at the second depth level.

Optionally, the three-dimensional positional sensor comprises a touch sensor configured to sense a touch position of the user input object during a touch control operation and a pressure sensor configured to sense a pressure applied during the touch control operation; and the three-dimensional position corresponding to the user input object during the touch control operation comprises a first coordinate along a depth direction corresponding to the pressure applied during the touch control operation, and a second coordinate and a third coordinate respectively along a length direction and a width direction corresponding to the touch position of the user input object during the touch control operation.

In another aspect, the present invention provides an electronic apparatus, comprising a privacy user interactive apparatus described herein.

In another aspect, the present invention provides a user interactive method for protecting privacy, comprising displaying a stereoscopic image of a user input interface in a three-dimensional display space; detecting a three-dimensional position of a user input object; and executing an operation in response to an input control signal; wherein the stereoscopic image of the user input interface is perceived as a three-dimensional image of the user input interface when viewed inside the three-dimensional display space and is perceived as a two-dimensional image when viewed outside the three-dimensional display space; and displaying the stereoscopic image of the user input interface comprises displaying a plurality of activatable virtual objects comprising at least a first group of one or more activatable virtual objects displayed substantially at a first depth level and a second group of one or more activatable virtual objects displayed substantially at a second depth level; the first depth level and the second depth level being two different depth levels in the three-dimensional image of the user input interface.

Optionally, the plurality of activatable virtual objects are visually separately discernable from each other when viewed in the three-dimensional display space and are not visually separately discernable from each other when viewed outside the three-dimensional display space.

Optionally, the user interactive method further comprises obtaining the three-dimensional position of the user input object; and displaying a position indicator in the three-dimensional image of the user input interface indicating the three-dimensional position of the user input object; wherein a three-dimensional position of the position indicator in the three-dimensional image of the user input interface changes in response to a change of the three-dimensional position of the user input object.

Optionally, executing an operation in response to the input control signal comprises generating a signal indicating that an activatable virtual object is a selected activatable virtual object when the position indicator is substantially coincident with the activatable virtual object.

Optionally, executing an operation in response to the input control signal comprises executing a function programmed for a selected activatable virtual object in response to a signal indicating that contents associated with the selected activatable virtual object is inputted.

Optionally, the plurality of activatable virtual objects further comprises a third group of one or more activatable virtual objects displayed substantially at a third depth level and a fourth group of one or more activatable virtual objects displayed substantially at a fourth depth level; the first depth level, the second depth level, the third depth level, and the fourth depth level being four different depth levels in the three-dimensional image of the user input interface.

Optionally, activatable virtual objects displayed substantially at the first depth level and the second depth level have at least partially overlapping projections on the display panel along a depth direction of the stereoscopic image.

Optionally, displaying the plurality of activatable virtual objects comprises displaying at least one of the plurality of activatable objects configured with a background context.

Optionally, the user input interface comprises a three-dimensional keyboard comprising a first group of one or more keys displayed substantially at the first depth level and a second groups of one or more keys displayed substantially at the second depth level.

Optionally, detecting the three-dimensional position of the user input object comprises sensing a touch position of the user input object during a touch control operation, and sensing a pressure applied during the touch control operation; and obtaining the three-dimensional position corresponding to the user input object during the touch control operation comprises obtaining a first coordinate along a depth direction based on the pressure corresponding to the touch control operation, and obtaining a second coordinate and a third coordinate respectively along a length direction and a width direction based on the touch position of the user input object during the touch control operation.

BRIEF DESCRIPTION OF THE FIGURES

The following drawings are merely examples for illustrative purposes according to various disclosed embodiments and are not intended to limit the scope of the present invention.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

Figure 1:
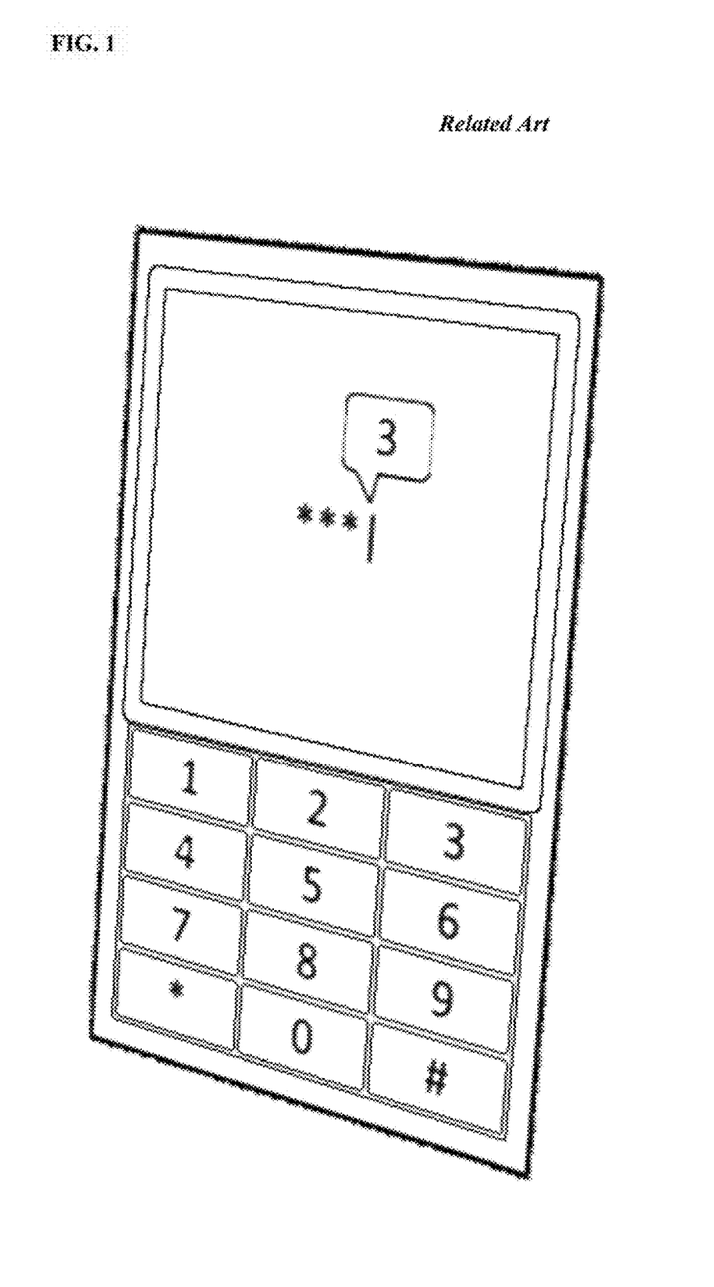
FIG. 1 is a schematic diagram illustrating a conventional user input apparatus on a mobile apparatus.

FIG. 1 is a schematic diagram illustrating a conventional user input apparatus on a mobile apparatus. Referring to FIG. 1, a user directly inputs a sensitive information such as a password on a keyboard of the mobile apparatus. The display panel of the mobile apparatus displays a two-dimensional image. The user may input the password on a physical keyboard of the mobile apparatus or a virtual keyboard displayed in the two-dimensional image. In either case, selection of keys on the keyboard can be easily viewed by a bystander, resulting in poor privacy. Even if the keys on the keyboard are randomly arranged, the password entry process may be videotaped by someone who intends to obtain the privacy information, and the password may be decoded by analyzing the entry process.

Conventional privacy protection methods typically involves reduction of a viewing angle of the display panel so that the two-dimensional image at the low viewing angle has a low contrast level, or a low brightness level, or contains an interference pattern, thereby enhancing privacy. For example, control electrodes may be installed on the display panel to provide an interference signal when it is desired to increase the privacy level. The interference signal produces a color shift in the display image at a large viewing angle, resulting in an interference pattern. However, the interference pattern typically does not provide a contrast level that is sufficient to protect privacy. In another example, a privacy film may be adhered onto the surface of the display panel to reduce viewing angle. However, because the privacy film is permanently adhered to the display panel, it severely limits the viewing angle of the display panel even when privacy is not required. For example, when a user wants to show a photo stored on a mobile phone to other people, they may have a difficult time viewing the photo due to the presence of the privacy film.

Accordingly, the present invention provides, inter alia, a privacy user interactive apparatus, an electronic apparatus having the same, and a user interactive method for protecting privacy that substantially obviate one or more of the problems due to limitations and disadvantages of the related art. In one aspect, the present disclosure provides a privacy user interactive apparatus. In some embodiments, the privacy user interactive apparatus includes a display panel configured to display a stereoscopic image of a user input interface in a three-dimensional display space; a three-dimensional positional sensor configured to detect a three-dimensional position of a user input object; and a processor coupled to the display panel and the three-dimensional positional sensor, configured to control the display panel to display the stereoscopic image of the user input interface in the three-dimensional display space, configured to receive an input control signal (e.g., a touch control signal) from the three-dimensional positional sensor, and configured to execute an operation in response to the input control signal. Optionally, the display panel is configured to display a two-dimensional image outside the three-dimensional display space. Optionally, the display panel is configured to display the stereoscopic image of the user input interface as a three-dimensional image inside the three-dimensional display space, and t as a two-dimensional image outside the three-dimensional display space. Optionally, the three-dimensional positional sensor is configured to detect a touch control operation of the user input object on the display panel and a pressure applied by the user input object during the touch control operation. The user input object may be a body part of a user (e.g., a finger) or a secondary object such as a touch pen, a stylus pen, a pointer. Optionally, the processor is configured to control the display panel to display a plurality of activatable virtual objects. Optionally, the plurality of activatable virtual objects are displayed at at least two different depth levels in the stereoscopic image of the user input interface. An activatable virtual object is an object of the user input interface such as a key of a keyboard, a menu, or a button. The activatable virtual object allows the user to take certain action with respect to the user input interface. Optionally, the plurality of activatable virtual objects includes at least a first group of one or more activatable virtual objects displayed substantially at a first depth level and a second group of one or more activatable virtual objects displayed substantially at a second depth level. The first depth level and the second depth level are two different depth levels in the stereoscopic image of the user input interface. Optionally, the plurality of activatable virtual objects further includes a third group of one or more activatable virtual objects displayed substantially at a third depth level and a fourth group of one or more activatable virtual objects displayed substantially at a fourth depth level; the first depth level, the second depth level, the third depth level, and the fourth depth level being four different depth levels in the stereoscopic image of the user input interface. Optionally, the plurality of activatable virtual objects are visually separately discernable from each other when viewed in the three-dimensional display space and are not visually separately discernable from each other when viewed outside the three-dimensional display space (e.g., in the two-dimensional display space).

Figure 2:
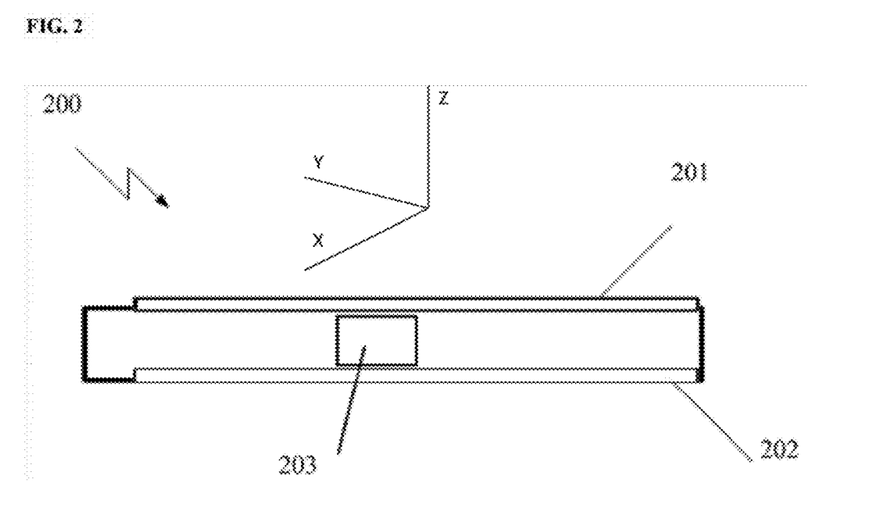
FIG. 2 is a schematic diagram illustrating the structure of a privacy user interactive apparatus in some embodiments according to the present disclosure.

As used herein, the term "depth" refers to a value indicating a distance difference between a first object and a second object (e.g., two activatable virtual objects) in the stereoscopic image, the first object is nearer to a viewpoint and the second object is further away from the viewpoint (e.g., along a depth direction such as a direction indicated by "Z" in FIG. 2). Optionally, the depth direction is a direction substantially normal to a surface of a display panel. When an object is viewed in a two-dimensional form (e.g., viewed outside the three-dimensional display space), a depth value of the object is defined as zero. When the object is viewed in a three-dimensional form (e.g., viewed inside the three-dimensional display space), the depth value of the object may be defined as a positive value or a negative value, depending on whether the object is perceived to protrude to the outside of the display panel or recess into the display panel. Optionally, two objects have a same depth level when the depths of the objects are substantially the same. Optionally, two objects have different depth levels when the depths of the objects are substantially different. For example, objects having depths that differ by at least 10%, at least 15%, at least 20%, at least 30% or more are objects having different depth levels.

FIG. 2 is a schematic diagram illustrating the structure of a privacy user interactive apparatus in some embodiments according to the present disclosure. Referring to FIG. 2, the privacy user interactive apparatus 200 in some embodiments includes a display panel 201, a three-dimensional positional sensor 202, and a processor 203. Optionally, the user interactive apparatus 200 is integrated into an electronic apparatus. In one example, the display panel 201, the three-dimensional positional sensor 202, and the processor 203 are respectively a display panel, a three-dimensional positional sensor, and a processor of the electronic apparatus. Optionally, the user interactive apparatus 200 is integrated into a mobile apparatus. In another example, the display panel 201, a three-dimensional positional sensor 202, and a processor 203 are respectively a display panel, a three-dimensional positional sensor, and a processor of the mobile apparatus.

In some embodiments, the display panel 201 is configured to display a stereoscopic image of a user input interface in a three-dimensional display space. For example, the display panel 201 is under control of the processor 203 to display the stereoscopic image of a user input interface in a three-dimensional display space. Optionally, the display panel 201 is configured to display a stereoscopic image of a user input interface in a three-dimensional display space. The stereoscopic image of the user input interface is perceived as a three-dimensional image when viewed inside the three-dimensional display space, and the stereoscopic image of the user input interface can only be perceived as a two-dimensional image when viewed outside the three-dimensional display space. Optionally, the user input interface is a three-dimensional keyboard. In one example, the stereoscopic image is an autostereoscopic image and the display panel 201 is an autostereoscopic display panel, the stereoscopic image is perceived by a user as occupying the three-dimensional display space. In another example, the display panel 201 generates a first image for a left eye of the user and a second image for a right eye of the user, and the user perceives the first image and the second image as a single image and interprets the single image as a three-dimensional image in the three-dimensional display space.

In some embodiments, the stereoscopic image of the user input interface displayed by the display panel 201 includes a plurality of activatable virtual objects. Optionally, the stereoscopic image of the user input interface displayed by the display panel 201 further includes one or more in-activatable object, e.g., background images. In one example, the user input interface is a three-dimensional keyboard, and the plurality of activatable virtual objects are a plurality of activatable virtual keys.

In some embodiments, the activatable virtual object is configured with a background context. Optionally, at least one of the activatable virtual objects is generated with a background context. Optionally, the plurality of activatable virtual objects are generated with one or more background context. Examples of background contexts include, but are not limited to, a font context, a paint context, a color context, a word context. The purpose of configuring the activatable virtual objects with the background context is to make the activatable virtual objects even less visually discernable when viewed outside the three-dimensional display space (e.g., in the two-dimensional display space).

In some embodiments, the stereoscopic image of a user input interface is displayed in a three-dimensional display space and is perceived as a three-dimensional image when viewed inside the three-dimensional display space. Referring to FIG. 2, the three-dimensional image has a length dimension ("X" dimension in FIG. 2), a width dimension ("Y" dimension in FIG. 2), and a depth dimension ("Z" dimension in FIG. 2). Optionally, the stereoscopic image can only be perceived as a two-dimensional image when viewed outside the three-dimensional display space. For example, the two-dimensional image does not have a depth dimension. Objects in the two-dimensional image have a depth value of zero.

In some embodiments, the plurality of activatable virtual objects are displayed at a plurality of (e.g., at least two) different depth levels in the stereoscopic image of the user input interface. For example, the plurality of activatable virtual objects may be divided into a plurality of groups (e.g., 2, 3, 4, 5, 6, or more), each group is displayed at a different depth level. In one example, the plurality of activatable virtual objects are divided into at least a first group of one or more activatable virtual objects and a second group of one or more activatable virtual objects, the first group is displayed substantially at a first depth level, and the second group is displayed substantially at a second depth level. In another example, the plurality of activatable virtual objects are divided into four groups, each of which is displayed at a different depth level.

In some embodiments, the plurality of activatable virtual objects are displayed substantially on a plurality of planes in the three-dimensional image inside the three-dimensional display space. Each of the plurality of planes has a different depth level such that the plurality of planes are sufficiently distinguishable, and activatable virtual objects on each plane can be separately controlled by a user input object. For example, the plurality of activatable virtual objects may be divided into a plurality of groups (e.g., 2, 3, 4, 5, 6, or more), each group is arranged on a different plane having a different depth level. In one example, the plurality of activatable virtual objects are divided into at least a first group of one or more activatable virtual objects and a second group of one or more activatable virtual objects, the first group is displayed substantially on a first plane at a first depth level, and the second group is displayed substantially on a second plane at a second depth level. In another example, the plurality of activatable virtual objects divided into four groups, each of which is displayed substantially on a different plane at a different depth level. Optionally, activatable virtual objects displayed substantially on the first plane at the first depth level and substantially on the second plane at the second depth level have at least partially overlapping projections on the display panel along a depth direction of the stereoscopic image. Optionally, activatable virtual objects displayed substantially on all planes at different depth levels have at least partially overlapping projections on the display panel along a depth direction of the stereoscopic image.

In some embodiments, the plurality of activatable virtual objects are displayed substantially in an array form or a quasi-array form in the three-dimensional image inside the three-dimensional display space. The array or quasi-array may, for example, include a plurality of rows of activatable virtual objects. Optionally, each row is displayed at a different depth level such that the plurality of rows are sufficiently distinguishable, and activatable virtual objects on each row can be separately controlled by a user input object. For example, the plurality of activatable virtual objects may be divided into a plurality of groups (e.g., 2, 3, 4, 5, 6, or more), each group is arranged on a different row having a different depth level. In one example, the plurality of activatable virtual objects are divided into at least a first group of one or more activatable virtual objects and a second group of one or more activatable virtual objects, the first group is displayed substantially in a first row at a first depth level, and the second group is displayed substantially in a second row at a second depth level. In another example, the plurality of activatable virtual objects divided into four groups, each of which is displayed substantially in a different row at a different depth level. Optionally, activatable virtual objects displayed substantially in the first row at the first depth level and substantially in the second row at the second depth level have at least partially overlapping projections on the display panel along a depth direction of the stereoscopic image. Optionally, activatable virtual objects displayed substantially on all rows at different depth levels have at least partially overlapping projections on the display panel along a depth direction of the stereoscopic image.

In some embodiments, the display panel 201 is switchable between a three-dimensional display mode and a two-dimensional display mode. In the three-dimensional display mode, the display panel 201 is configured to display a stereoscopic image of a user input interface in a three-dimensional display space, and the stereoscopic image is perceived as a three-dimensional image when viewed inside the three-dimensional display space and is perceived as a two-dimensional image when viewed outside the three-dimensional display space. In the two-dimensional display mode, the display panel 201 is configured to display only a two-dimensional image, e.g., no stereoscopic image is displayed.

In one example, the processor 203 is configured to control the display panel 203 in the three-dimensional display mode when the privacy user interactive apparatus is powering up. In another example, the processor 203 is configured to control the display panel 203 in the three-dimensional display mode upon receiving a user command. Optionally, the user command is inputted by a user through a physical key. Optionally, the user command is inputted by a user through a virtual key. In another example, the processor 203 is configured to control the display panel 203 in the three-dimensional display mode when the user is prompted to enter a private information such as a password, an account number, and a credit card number required for starting or executing an application program.

Figure 3:
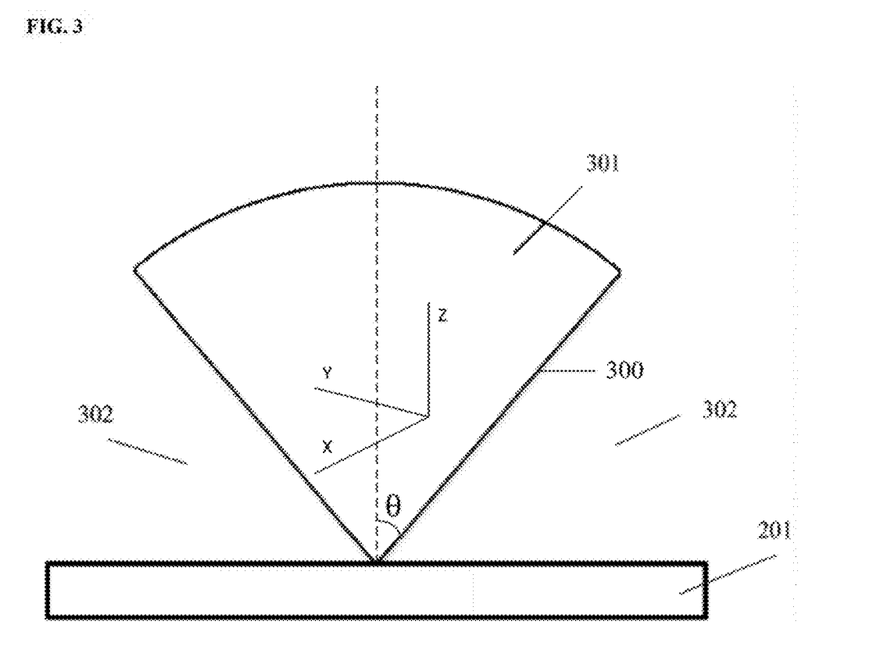
FIG. 3 is a schematic diagram illustrating display of a stereoscopic image in a three-dimensional display space and a two-dimensional display space outside the three-dimensional display space in some embodiments according to the present disclosure.

FIG. 3 is a schematic diagram illustrating display of a stereoscopic image in a three-dimensional display space and a two-dimensional display space outside the three-dimensional display space in some embodiments according to the present disclosure. Referring to FIG. 3, the display panel 201 has a display space that includes a three-dimensional display space 301 and a two-dimensional display space 302 outside the three-dimensional display space 301. The three-dimensional display space 301 is in front of the display panel 201. Optionally, the three-dimensional display space 301 is defined by a display limit 300, which divides the display space into the three-dimensional display space 301 and the two-dimensional display space 302. In one example, the three-dimensional display space 301 for each point (e.g., each subpixel) of the display panel is defined by an angle θ between the display limit 300 and a line extending outwards from the point and normal to a plane of the display panel. Optionally, the three-dimensional display space 301 for each point on the display panel 201 is a cone-shape space, and the three-dimensional display space for the entire display panel 201 is a truncated cone-shaped space. Outside the truncated cone-shaped space, a two-dimensional image is displayed and no three-dimensional image can be viewed. The stereoscopic image of the user input interface is perceived as a three-dimensional image when viewed inside the three-dimensional display space, and the stereoscopic image of the user input interface can only be perceived as a two-dimensional image when viewed outside the three-dimensional display space. The three-dimensional display space for the display panel 201 may be configured to have various appropriate shapes. In one example, the three-dimensional display space for the display panel 201 is a truncated pyramid space. In another example, the three-dimensional display space for the display panel 201 is a cuboid-shaped space.

Figure 4:
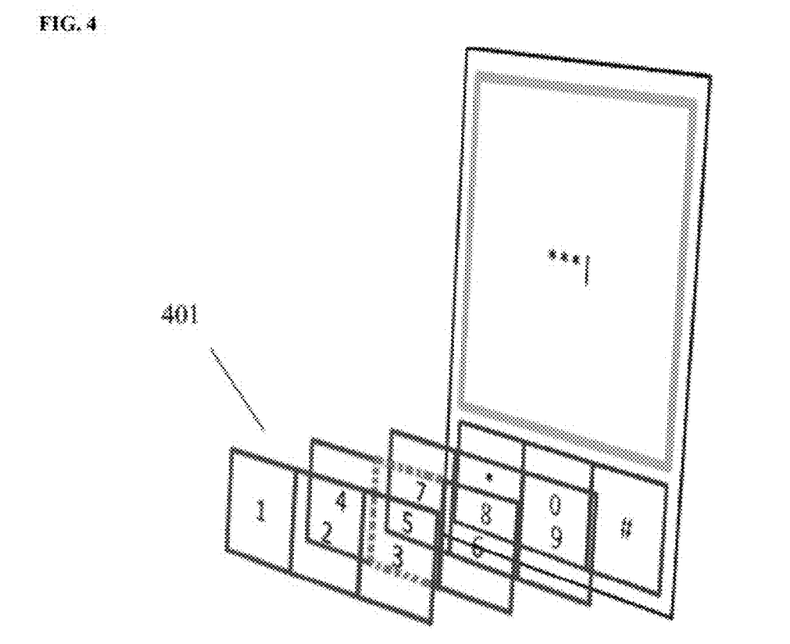
FIG. 4 is a schematic diagram illustrating a stereoscopic image of a user input interface displayed in a three-dimensional display space in some embodiments according to the present disclosure.

FIG. 4 is a schematic diagram illustrating a stereoscopic image of a user input interface displayed in a three-dimensional display space in some embodiments according to the present disclosure. Referring to FIG. 4, the stereoscopic image of a user input interface displayed in a three-dimensional display space is a three-dimensional keyboard 401, and the plurality of activatable virtual objects are a plurality of keys. For example, the three-dimensional keyboard 401 may include a plurality of number keys (e.g., numbers 0-9) and symbol keys (e.g., symbols *, #, $, and $). As shown in FIG. 4, the three-dimensional keyboard 401 includes ten number keys (0-9) and two symbol keys, * and #, and the three-dimensional keyboard 401 is displayed at four different depth levels. At each level, three keys selected from ten number keys and two symbol keys, * and #, are displayed. Optionally, the three-dimensional keyboard 401 is displayed at more than four depth levels. Optionally, the three-dimensional keyboard 401 includes a plurality of number keys, symbol keys, and function keys (e.g., a confirmation key, a "finish" key). In some embodiments, the three-dimensional keyboard 401 further includes a plurality of letter keys. Optionally, the three-dimensional keyboard 401 includes a plurality of letter keys, number keys, symbol keys, and function keys. Optionally, the three-dimensional keyboard 401 is divided into a plurality of groups (e.g., 2, 3, 4, 5), each group is displayed at a different depth level. Each group may include one or more keys selected from the group including letter keys, number keys, symbol keys, and function keys.

Figure 5:
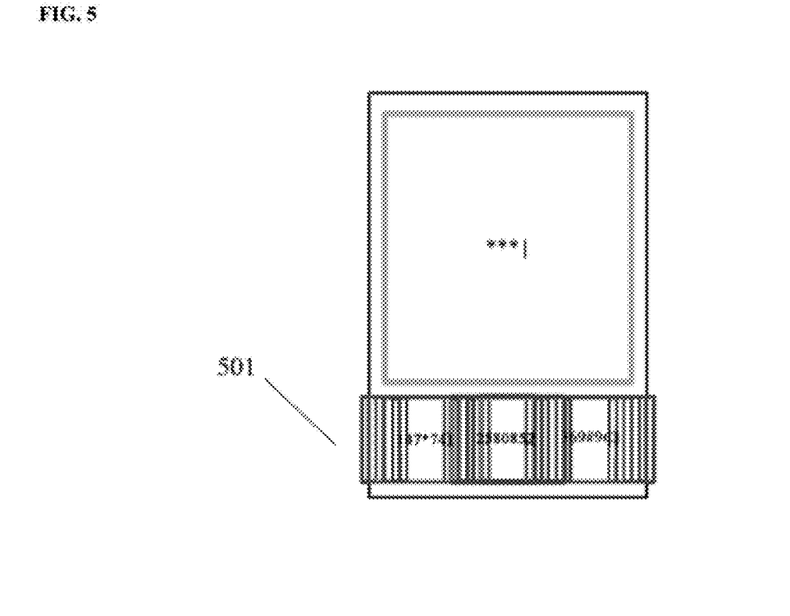
FIG. 5 is a schematic diagram illustrating a two-dimensional image of a user input interface displayed outside a three-dimensional display space in some embodiments according to the present disclosure.

FIG. 5 is a schematic diagram illustrating a two-dimensional image of a user input interface displayed outside a three-dimensional display space in some embodiments according to the present disclosure. Referring to FIG. 5, the two-dimensional image 501 displayed outside the three-dimensional display space is essentially a superimposed image. For example, the two-dimensional image 501 displayed outside the three-dimensional display space is equivalent to having the plurality of keys in the three-dimensional keyboard displayed at different levels all superimposed onto a surface of the display panel. As a result, the superimposed keys displayed in the two-dimensional display space become indistinguishable from each other. A bystander or a spying device cannot recognize the keys being selected by the user when the user is inputting a personal information by setting the display panel in a three-dimensional display mode.

In some embodiments, activatable virtual objects displayed at at least two depth levels have at least partially overlapping projections on the display panel along a depth direction of the stereoscopic image. For example, when the user input interface displayed in the three-dimensional display space includes a three-dimensional keyboard having a plurality of activatable virtual keys, activatable virtual keys displayed at at least two depth levels have at least partially overlapping projections on the display panel along the depth direction of the stereoscopic image. By having this design, the two-dimensional image displayed outside the three-dimensional display space includes a superimposed image of at least partially overlapping keys corresponding to keys displayed in the three-dimensional display space whose projections along the depth direction of the stereoscopic image at least partially overlap on the display panel. As a result, the superimposed, partially overlapping, keys displayed in the two-dimensional display space become even more indistinguishable from each other, further protecting privacy of the user.

In some embodiments, the stereoscopic image of the user input interface includes at least one in-activatable object. Optionally, each depth level of the stereoscopic image includes at least one in-activatable object. Optionally, the in-activatable object is a background region having a certain pattern. For example, when the user input interface displayed in the three-dimensional display space is a three-dimensional keyboard having a plurality of keys, the keyboard at each depth level includes a background image. By having this design, the two-dimensional image displayed outside the three-dimensional display space would include a superimposed image of a plurality of keys and background patterns displayed at various depth levels. Camouflaged by the background patterns, the keys displayed in the two-dimensional display space become even more indistinguishable from each other, further protecting privacy of the user.

In some embodiments, the activatable virtual object is configured with a background context. Optionally, the one or more activatable virtual objects in each depth level are configured with a background context. Optionally, each level of the activatable virtual objects is configured with a different background context. Optionally, each of the plurality of activatable virtual objects is configured with a background context. Optionally, each activatable virtual object is configured with a different background context. By having a background context, the plurality of activatable virtual objects are rendered even less discernable when viewed outside the three-dimensional display space (e.g., in the two-dimensional display space). Examples of background contexts include, but are not limited to, a font context, a paint context, a color context, a word context.

In some embodiments, the three-dimensional display space for displaying the stereoscopic image occupies only a portion of the surface of the display panel. For example, the three-dimensional display space for displaying the stereoscopic image occupies only the lower portion of the surface of the display panel, as shown in FIGS. 4 and 5. The remainder of the surface of the display panel can be used for normal two-dimensional image display. Optionally, only a portion of the display panel is capable of displaying the stereoscopic image. In one example, the portion of the display panel capable of display the stereoscopic image is a three-dimensional autostereoscopic display panel portion, and the remainder of the display panel is a normal two-dimensional display panel portion.

Optionally, the stereoscopic image is perceived to extend from the surface of the display panel in a direction towards the user, as shown in FIGS. 4 and 5, but not in a direction away from the user. In one example, the image perceived by the user "protruding" out of the display panel. Optionally, the stereoscopic image is perceived to extend from the surface of the display panel in a direction away from the user, but not in a direction towards the user. In another example, the image perceived by the user recessing beneath the display panel. Optionally, the stereoscopic image is perceived to extend from the surface of the display panel in both directions, e.g., away from and towards the user.

Various three-dimensional display panels may be used for making the display panel configured to display the stereoscopic image of a user input interface in a three-dimensional display space. In some embodiments, the display panel generates a first image for a left eye of the user and a second image for a right eye of the user, and the first image and the second image are shifted slightly relative to each other. The user perceives the first image and the second image as a single image and interprets the single image as a three-dimensional image in the three-dimensional display space. The stereoscopic image may be generated by the display panel under the control of the processor, which executes a stereoscopic display program based on a series of stereoscopic display data. Optionally, the privacy user interactive apparatus further includes a memory for storing the stereoscopic display program and the stereoscopic display data.

Referring to FIG. 2, the three-dimensional positional sensor 202 in some embodiments is coupled to the display panel 201 and configured to detect a touch control operation on the display panel 201. The three-dimensional positional sensor 202 is also coupled to the processor 203 and is configured to transmit a touch control signal to the processor 203. The processor 203 is coupled to the display panel 201 and the three-dimensional positional sensor 202, and is configured to control the display panel 201 to display the stereoscopic image of the user input interface in the three-dimensional display space, configured to receive the touch control signal from the three-dimensional positional sensor 202, and configured to execute an operation in response to the touch control signal.

As shown in FIG. 2, the three-dimensional positional sensor is a three-dimensional touch sensor. For example, the three-dimensional touch sensor may include a touch sensor configured to sense a two-dimensional touch position of the user input object during a touch control operation and a pressure sensor configured to sense a pressure applied during the touch control operation. Accordingly, the three-dimensional touch sensor is configured to detect a touch control operation of the user input object on the display panel and a pressure applied by the user input object during the touch control operation. Various appropriate three-dimensional positional sensor may be used. Examples of three-dimensional positional sensors include, but are not limited to, an ultrasonic sensor, a camera sensor, a three-dimensional time-of-flight sensor, a proximity sensor, and a stereoscopic touch sensor.

In some embodiments, the processor 203 is configured to obtain a three-dimensional position of a user input object during the touch control operation, and configured to display a position indicator in the stereoscopic image of the user input interface indicating the three-dimensional position of the user input object. In one example, the three-dimensional positional sensor 202 is configured to detect a three-dimensional position corresponding to a user input object during the touch control operation, and configured to transmit a touch control signal containing information regarding the three-dimensional position corresponding to a user input object during the touch control operation. The processor 203 obtains the three-dimensional position of a user input object during the touch control operation through the touch control signal, and configured to control the display panel to display a position indicator in the stereoscopic image of the user input interface indicating the three-dimensional position of the user input object. A three-dimensional position of the position indicator in the stereoscopic image changes in response to a change of the three-dimensional position of the user input object. In another example, the user input object is a finger of the user, and the position indicator is an image of the user's finger. When the user moves the finger on the touch display panel, the image of the finger in the stereoscopic image moves corresponding to the finger's movement. When the user presses the finger on the touch display panel, the image of the finger in the stereoscopic image moves along the depth direction of the stereoscopic image. By having this design, a direct visual picture of the touch control is provided to the user. Optionally, the position indicator is a cursor or an appropriate icon or graphics.

In some embodiments, the three-dimensional positional sensor 202 includes a touch sensor configured to sense a touch position of the user input object during the touch control operation and a pressure sensor configured to sense a pressure applied during the touch control operation. Optionally, the touch sensor is a capacitive touch sensor. The three-dimensional position corresponding to the user input object during the touch control operation includes a first coordinate along a depth direction (e.g., the direction along the "Z" axis in FIG. 2) corresponding to the pressure applied during the touch control operation, and a second coordinate and a third coordinate respectively along a length direction and a width direction (e.g., the direction along the "X" axis and the direction along the "Y" axis in FIG. 2) corresponding to the touch position of the user input object during the touch control operation.

In some embodiments, the first coordinate along the depth direction is determined based on the pressure applied during the touch control operation and a correlation between the applied pressure and a first coordinate. In one example, a pre-set correlation may be stored in a memory coupled to the processor 203. In another example, a look-up table including the correlation between the applied pressure and a plurality of first coordinates along the depth direction may be stored in the memory. In an exemplary look-up table, substantially no pressure applied corresponds to a lowest depth level in the stereoscopic image, a light pressure corresponds to a second depth level in the stereoscopic image, a medium pressure corresponds to a third depth level in the stereoscopic image, and a large pressure corresponds to a top depth level in the stereoscopic image. Based on the correlation between the pressure applied to during the touch control operation and the first coordinate, the processor 203 is configured to generate the first coordinate along the depth direction upon receiving a touch control signal containing information regarding the pressure applied during the touch control operation.

In some embodiments, the stereoscopic image of the user input interface includes a plurality of activatable virtual objects (e.g., a plurality of keys in a three-dimensional keyboard), and the processor 203 is configured to generate a signal indicating that an activatable virtual object is selected. Optionally, an activatable virtual object may become a selected activatable virtual object when the position indicator is substantially coincident with the activatable virtual object. For example, when the position indicator is substantially coincident with an activatable virtual key in a three-dimensional keyboard, the processor 203 is configured to generate a signal indicating that the key is selected by the user. As used herein, the term "substantially coincident" in the context of the present disclosure means that at least a portion of the position indicator in the stereoscopic image is within a threshold distance of the activatable virtual object. Optionally, the position indicator is substantially coincident with the activatable virtual object when at least a portion of the position indicator overlaps with the activatable virtual object.

In one example, the position indicator is within a threshold distance from an activatable virtual key in the three-dimensional keyboard, the processor 203 is configured to control the display panel 201 to alter the image of the position indicator, or the image of the key, or the image of a background of the key, or any combination thereof. Image alteration may be performed by a font change, a color change, a background change, or highlighting. The signal indicating that a key is selected by the user may be any appropriate signal. For example, the signal may be a sound signal. Optionally, the signal is a vibration signal.

Figure 6:
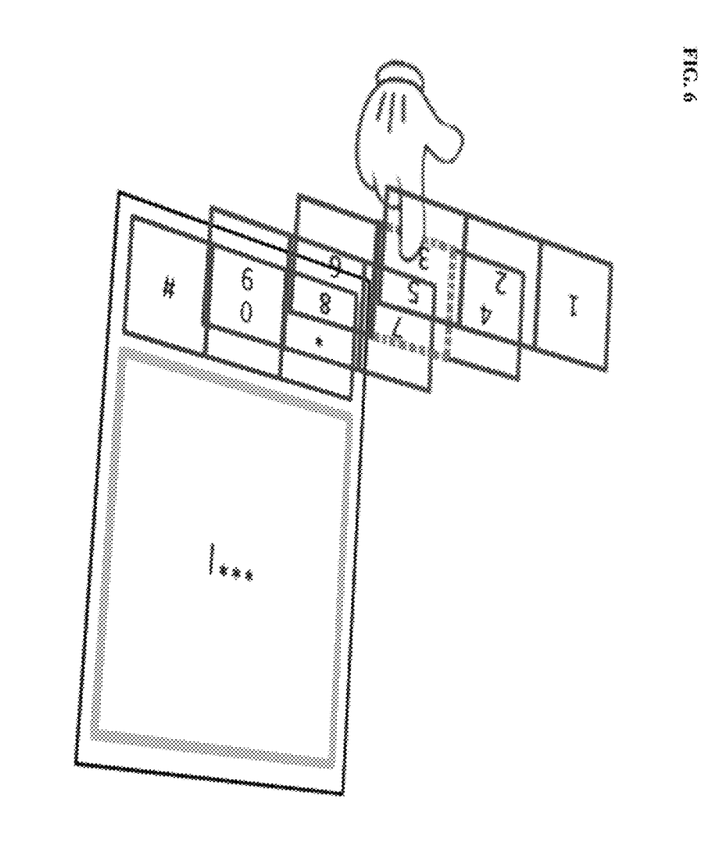
FIG. 6 is a schematic diagram illustrating selection of a key in a user input interface displayed in a three-dimensional display space in some embodiments according to the present disclosure.

FIG. 6 is a schematic diagram illustrating selection of a key in a user input interface displayed in a three-dimensional display space in some embodiments according to the present disclosure. Referring to FIG. 6, when the position indicator (an image of the user's finger) is substantially coincident with the "5" key, the "5" key is selected, and the frame of the "5" key becomes bold, indicating to the user that the "5" key is selected.

In some embodiments, the processor 203 is configured to execute a function programmed for the selected activatable virtual object upon receiving a signal indicating that contents associated with the selected activatable virtual object is inputted. Optionally, the selected activatable virtual object is a selected activatable virtual key in a three-dimensional keyboard.

Various signals may be used for indicating that contents associated with the selected activatable virtual object is inputted. In one example, the signal is an operation in which the position indicator remains coincident with a selected activatable virtual object (e.g., a selected activatable virtual key) for a duration longer than a threshold value. In another example, the signal is a double-click operation on the selected activatable virtual object within a certain time period. In another example, the signal is a click operation on a specified location of the display panel while the position indicator is coincident with the selected activatable virtual object. In another example, the signal is a click operation on a physical key of the display panel. In another example, the signal is a click on a virtual key of the display panel.

Various functions may be executed by the processor 203 in response to the signal indicating that contents associated with the selected activatable virtual object is inputted. In one example, the processor 203 is configured to store information of the contents of the selected activatable virtual object in a memory for subsequent processing, e.g., until all necessary information for a password or an account number has been inputted. In another example, the processor 203 is configured to verify an inputted password with a password stored in a memory. In another example, the processor 203 is configured to encrypt the display of the contents of the selected activatable virtual object in a data entry display box.

In some embodiments, the user may input a signal indicating that data entry is completed, e.g., a password entry is completed. Upon receiving the signal indicating that data entry is completed, the processor 203 is configured to turn off the stereoscopic image of the user input interface, e.g., the three-dimensional keyboard. In one example, the user may click on an activatable virtual key in the three-dimensional keyboard to indicate that data entry is completed. In another example, the user may click on a virtual key or a physical key on the display panel to indicate that data entry is completed.

In another aspect, the present disclosure provides an electronic apparatus having a privacy user interactive apparatus described herein. Optionally, the electronic apparatus is a mobile apparatus, e.g., a mobile phone.

Figure 7:
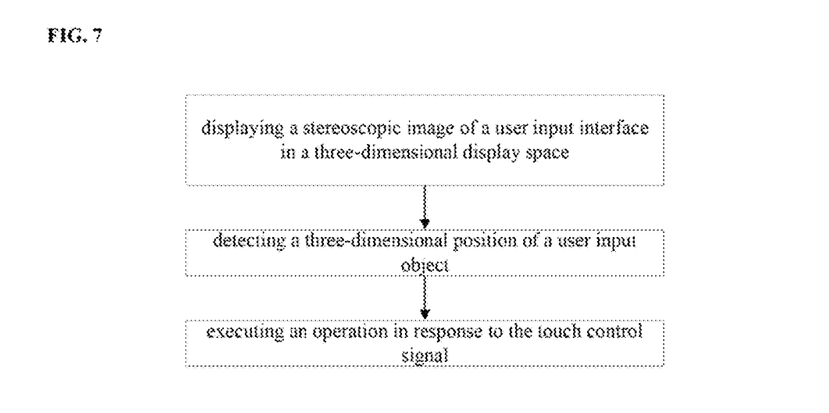
FIG. 7 is a flow chart illustrating a user interactive method in some embodiments according to the present disclosure.

In another aspect, the present disclosure provides a user interactive method for protecting privacy. FIG. 7 is a flow chart illustrating a user interactive method in some embodiments according to the present disclosure. Referring to FIG. 7, the user interactive method for protecting privacy in some embodiments includes generating and displaying a stereoscopic image of a user input interface in a three-dimensional display space; detecting a three-dimensional position of a user input object; and executing an operation in response to an input control signal (e.g., a touch control signal). The stereoscopic image of the user input interface is perceived as a three-dimensional image when viewed inside the three-dimensional display space, and the stereoscopic image of the user input interface can only be perceived as a two-dimensional image when viewed outside the three-dimensional display space. Optionally, detecting the three-dimensional position of the user input object includes detecting a touch control operation of the user input object on the display panel and a pressure applied by the user input object during the touch control operation.

In some embodiments, the user interactive method further includes obtaining the three-dimensional position of the user input object, and displaying a position indicator in the stereoscopic image of the user input interface indicating the three-dimensional position of the user input object. Optionally, a three-dimensional position of the position indicator in the stereoscopic image changes in response to a change of the three-dimensional position of the user input object. Optionally, the stereoscopic image of the user input interface includes a plurality of activatable virtual objects, and the step of executing an operation in response to the input control signal includes generate a signal indicating that an activatable virtual object is a selected activatable virtual object when the position indicator is substantially coincident with the activatable virtual object. Optionally, the plurality of activatable virtual objects are visually separately discernable from each other when viewed in the three-dimensional display space and are not visually separately discernable from each other when viewed outside the three-dimensional display space (e.g., in the two-dimensional display space).

In some embodiments, the step of generating and displaying the stereoscopic image of the user input interface includes generating and displaying a plurality of activatable virtual objects, and the step of executing an operation in response to the input control signal includes executing an operation in response to the input control signal includes executing a function programmed for the selected activatable virtual object in response to a signal indicating that contents associated with the selected activatable virtual object is inputted.

In some embodiments, the step of generating and displaying the stereoscopic image of the user input interface includes generating and displaying a plurality of activatable virtual objects; and the plurality of activatable virtual objects are displayed at a plurality of different depth levels in the stereoscopic image of the user input interface. Optionally, the plurality of activatable virtual objects are displayed at four different depth levels in the stereoscopic image of the user input interface. Optionally, the plurality of activatable virtual objects includes at least a first group of one or more activatable virtual objects displayed substantially at a first depth level and a second group of one or more activatable virtual objects displayed substantially at a second depth level; the first depth level and the second depth level being two different depth levels in the stereoscopic image of the user input interface. Optionally, the plurality of activatable virtual objects further includes a third group of one or more activatable virtual objects displayed substantially at a third depth level and a fourth group of one or more activatable virtual objects displayed substantially at a fourth depth level; the first depth level, the second depth level, the third depth level, and the fourth depth level being four different depth levels in the stereoscopic image of the user input interface. Optionally, activatable virtual objects displayed at at least two depth levels (e.g., the first depth level and the second depth level) have at least partially overlapping projections on the display panel along a depth direction of the stereoscopic image.

In some embodiments, the stereoscopic image of the user input interface includes a plurality of activatable virtual objects and at least one in-activatable object. Optionally, each depth level of the stereoscopic image includes an in-activatable object. Optionally, the in-activatable object is a background region having a certain pattern.

In some embodiments, the step of generating and displaying the plurality of activatable virtual objects includes generating and displaying at least one of the plurality of activatable configured with a background context. Optionally, at least one of the activatable virtual objects is generated with a background context. Optionally, the plurality of activatable virtual objects are generated with one or more background context. Optionally, the one or more activatable virtual objects in each depth level are configured with a background context. Optionally, each level of the activatable virtual objects is configured with a different background context. Optionally, each of the plurality of activatable virtual objects is configured with a background context. Optionally, each activatable virtual object is configured with a different background context. By having a background context, the plurality of activatable virtual objects are rendered even less discernable when viewed outside the three-dimensional display space (e.g., in the two-dimensional display space). Examples of background contexts include, but are not limited to, a font context, a paint context, a color context, a word context. Examples of background contexts include, but are not limited to, a font context, a paint context, a color context, a word context. The purpose of configuring the activatable virtual objects with the background context is to make the activatable virtual objects even less visually discernable when viewed outside the three-dimensional display space (e.g., in the two-dimensional display space).

Optionally, the user input interface includes a three-dimensional keyboard including a plurality of activatable virtual keys displayed at a plurality of different depth levels. In one example, the plurality of activatable virtual keys includes a first group of one or more activatable virtual keys displayed substantially at a first depth level and a second group of one or more activatable virtual keys displayed substantially at a second depth level. In another example, the plurality of activatable virtual keys further includes a third group of one or more activatable virtual keys displayed substantially at a third depth level and a fourth group of one or more activatable virtual keys displayed substantially t a fourth depth level. The first depth level, the second depth level, the third depth level, and the fourth depth level are four different depth levels. Optionally, the user input interface further includes at least one in-activatable object at each depth level.

In some embodiments, the step of detecting the three-dimensional position of the user input object includes sensing a touch position of the user input object during a touch control operation, and sensing a pressure applied by the user input object during the touch control operation. Optionally, the step of obtaining the three-dimensional position corresponding to the user input object during the touch control operation includes obtaining a first coordinate along a depth direction based on the pressure corresponding to the touch control operation, and obtaining a second coordinate and a third coordinate respectively along a length direction and a width direction based on the touch position of the user input object during the touch control operation.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A privacy user interactive apparatus, comprising:
a display panel configured to display a stereoscopic image of a user input interface in a three-dimensional display space;
a three-dimensional positional sensor configured to detect a three-dimensional position of a user input object; and
a processor coupled to the display panel and the three-dimensional positional sensor, configured to control the display panel to display the stereoscopic image of the user input interface in the three-dimensional display space, configured to receive an input control signal from the three-dimensional positional sensor, and configured to execute an operation in response to the input control signal;
wherein the display panel is configured to display an image of the user input interface in a display space;
the display space is divided into the three-dimensional display space and a two-dimensional display space based on a view angle with respect to the display panel, the three-dimensional display space being within a threshold view angle range, and the two-dimensional display space being outside the threshold view angle range;
the image of the user input interface is viewed as a three-dimensional image of the user input interface in the three-dimensional display space and in the threshold viewing angle range, and is viewed as a two-dimensional image outside the three-dimensional display space and in the two-dimensional display space and outside the threshold viewing angle range; and
the processor is configured to control the display panel to display a plurality of activatable virtual objects comprising at least a first group of one or more activatable virtual objects substantially at a first depth level and a second group of one or more activatable virtual objects substantially at a second depth level in the three-dimensional display space, and is configured to control the display panel to display a superimposed image of the plurality of activatable virtual objects in the two-dimensional display space; the first depth level and the second depth level being two different depth levels in the three-dimensional image of the user input interface.

2. The privacy user interactive apparatus of claim 1, wherein the plurality of activatable virtual objects are visually separately discernable from each other when viewed in the three-dimensional display space and are not visually separately discernable from each other when viewed outside the three-dimensional display space.

3. The privacy user interactive apparatus of claim 1, wherein the three-dimensional positional sensor is configured to detect a touch control operation of the user input object on the display panel and a pressure applied by the user input object during the touch control operation.

4. The privacy user interactive apparatus of claim 1, wherein the processor is configured to obtain the three-dimensional position of the user input object, configured to control the display panel to display a position indicator in the three-dimensional image of the user input interface indicating the three-dimensional position of the user input object; and
a three-dimensional position of the position indicator in the three-dimensional image of the user input interface changes in response to a change of the three-dimensional position of the user input object.

5. The privacy user interactive apparatus of claim 4, wherein
the processor is configured to generate a signal indicating that an activatable virtual object is a selected activatable virtual object when the position indicator is substantially coincident with the activatable virtual object.

6. The privacy user interactive apparatus of claim 4, wherein
the processor is configured to execute a function programmed for a selected activatable virtual object upon receiving a signal indicating that contents associated with the selected activatable virtual object is inputted.

7. The privacy user interactive apparatus of claim 4, wherein the three-dimensional positional sensor comprises a touch sensor configured to sense a touch position of the user input object during a touch control operation and a pressure sensor configured to sense a pressure applied during the touch control operation; and
the three-dimensional position corresponding to the user input object during the touch control operation comprises a first coordinate along a depth direction corresponding to the pressure applied during the touch control operation, and a second coordinate and a third coordinate respectively along a length direction and a width direction corresponding to the touch position of the user input object during the touch control operation.

8. The privacy user interactive apparatus of claim 1, wherein the plurality of activatable virtual objects further comprises a third group of one or more activatable virtual objects displayed substantially at a third depth level and a fourth group of one or more activatable virtual objects displayed substantially at a fourth depth level; the first depth level, the second depth level, the third depth level, and the fourth depth level being four different depth levels in the three-dimensional image of the user input interface.

9. The privacy user interactive apparatus of claim 1, wherein activatable virtual objects displayed substantially at the first depth level and the second depth level have at least partially overlapping projections on the display panel along a depth direction of the stereoscopic image.

10. The privacy user interactive apparatus of claim 1, wherein the processor is configured to control the display panel to display at least one of the plurality of activatable virtual objects configured with a background context.

11. The privacy user interactive apparatus of claim 1, wherein the user input interface comprises a three-dimensional keyboard comprising a first group of one or more keys displayed substantially at the first depth level and a second groups of one or more keys displayed substantially at the second depth level.

12. An electronic apparatus, comprising:
a display panel configured to display a stereoscopic image of a user input interface in a three-dimensional display space;
a three-dimensional positional sensor configured to detect a three-dimensional position of a user input object; and
a processor coupled to the display panel and the three-dimensional positional sensor, configured to control the display panel to display the stereoscopic image of the user input interface in the three-dimensional display space, configured to receive an input control signal from the three-dimensional positional sensor, and configured to execute an operation in response to the input control signal;
wherein the display panel is configured to display an image of the user input interface in a display space;

the display space is divided into the three-dimensional display space and a two-dimensional display space based on a view angle with respect to the display panel, the three-dimensional display space being within a threshold view angle range, and the two-dimensional display space being outside the threshold view angle range;

the image of the user input interface is viewed as a three-dimensional image of the user input interface in the three-dimensional display space and in the threshold viewing angle range, and is viewed as a two-dimensional image outside the three-dimensional display space and in the two-dimensional display space and outside the threshold viewing angle range; and the processor is configured to control the display panel to display a plurality of activatable virtual objects comprising at least a first group of one or more activatable virtual objects substantially at a first depth level and a second group of one or more activatable virtual objects substantially at a second depth level in the three-dimensional display space, and is configured to control the display panel to display a superimposed image of the plurality of activatable virtual objects in the two-dimensional display space; the first depth level and the second depth level being two different depth levels in the three-dimensional image of the user input interface.

13. A user interactive method for protecting privacy, comprising:

displaying an image of a user input interface in a display space, the display space is divided into a three-dimensional display space and a two-dimensional display space based on a view angle with respect to a display panel, the three-dimensional display space being within a threshold view angle range, and the two-dimensional display space being outside the threshold view angle range;

detecting a three-dimensional position of a user input object; and executing an operation in response to an input control signal;

wherein the image of the user input interface is perceived as a three-dimensional image of the user input interface when viewed inside the three-dimensional display space and in the threshold viewing angle range, and is perceived as a two-dimensional image when viewed outside the three-dimensional display space and in the two-dimensional display space and outside the threshold viewing angle range; and displaying the image of the user input interface comprises displaying a plurality of activatable virtual objects comprising at least a first group of one or more activatable virtual objects displayed substantially at a first depth level and a second group of one or more activatable virtual objects displayed substantially at a second depth level in the three-dimensional display space, displaying a superimposed image of the plurality of activatable virtual objects in the two-dimensional display space; the first depth level and the second depth level being two different depth levels in the three-dimensional image of the user input interface.

14. The user interactive method of claim 13, wherein the plurality of activatable virtual objects are visually separately discernable from each other when viewed in the three-dimensional display space and are not visually separately discernable from each other when viewed outside the three-dimensional display space.

15. The user interactive method of claim 13, wherein detecting the three-dimensional position of the user input object comprises detecting a touch control operation of the user input object on the display panel and a pressure applied by the user input object during the touch control operation.

16. The user interactive method of claim 13, further comprising obtaining the three-dimensional position of the user input object; and displaying a position indicator in the three-dimensional image of the user input interface indicating the three-dimensional position of the user input object;

wherein a three-dimensional position of the position indicator in the three-dimensional image of the user input interface changes in response to a change of the three-dimensional position of the user input object.

17. The user interactive method of claim 16, wherein executing an operation in response to the input control signal comprises generating a signal indicating that an activatable virtual object is a selected activatable virtual object when the position indicator is substantially coincident with the activatable virtual object.

18. The user interactive method of claim 13, wherein executing an operation in response to the input control signal comprises executing a function programmed for a selected activatable virtual object in response to a signal indicating that contents associated with the selected activatable virtual object is inputted.

19. The user interactive method of claim 13, wherein the plurality of activatable virtual objects further comprises a third group of one or more activatable virtual objects displayed substantially at a third depth level and a fourth group of one or more activatable virtual objects displayed substantially at a fourth depth level; the first depth level, the second depth level, the third depth level, and the fourth depth level being four different depth levels in the three-dimensional image of the user input interface.

20. The user interactive method of claim 13, wherein activatable virtual objects displayed substantially at the first depth level and the second depth level have at least partially overlapping projections on the display panel along a depth direction of the three-dimensional image.

* * * * *